(12) United States Patent
Khaira et al.

(10) Patent No.: US 11,102,580 B2
(45) Date of Patent: Aug. 24, 2021

(54) HEADSET CHARGER NODE

(71) Applicant: AVNERA CORPORATION, Hillsboro, OR (US)

(72) Inventors: Manpreet S. Khaira, Portland, OR (US); David McNeill, Portland, OR (US); Eric Sorensen, Portland, OR (US); Sydney Newton, Portland, OR (US)

(73) Assignee: AVNERA CORPORATION, Hillsboro, OR (US)

( * ) Notice: Subject to any disclaimer, the term of this patent is extended or adjusted under 35 U.S.C. 154(b) by 582 days.

(21) Appl. No.: 15/795,721

(22) Filed: Oct. 27, 2017

(65) Prior Publication Data
US 2018/0124517 A1 May 3, 2018

Related U.S. Application Data

(60) Provisional application No. 62/414,615, filed on Oct. 28, 2016.

(51) Int. Cl.
*H04R 5/04* (2006.01)
*H04R 1/10* (2006.01)
(Continued)

(52) U.S. Cl.
CPC ............... *H04R 5/04* (2013.01); *B23P 19/04* (2013.01); *H04R 1/1025* (2013.01); *H04R 5/033* (2013.01);
(Continued)

(58) Field of Classification Search
CPC ............... H04R 1/1016; H04R 1/1041; H04R 2420/07; H04R 1/1025; H04R 1/1033;
(Continued)

(56) References Cited

U.S. PATENT DOCUMENTS

2012/0033824 A1* 2/2012 Sim ...................... H04R 1/1041
381/74
2015/0078575 A1* 3/2015 Selig ..................... H04R 1/1025
381/74
(Continued)

FOREIGN PATENT DOCUMENTS

CN 203690662 U 7/2014
EP 2905859 A1 8/2015

OTHER PUBLICATIONS

International Search Report and Written Opinion issued in International Application No. PCT/US2017/058815, dated Feb. 2, 2018 (14 pgs.).

*Primary Examiner* — Lun-See Lao
(74) *Attorney, Agent, or Firm* — Lando & Anastasi, LLP (57) ABSTRACT

The disclosure includes a headset including one or more earphones and a connector configured to couple data and charge between the headset and a user equipment (UE). The headset also includes a charge node. The charge node includes a charge port for receiving UE charge from a charge source. The charge node also includes a downstream port for coupling audio data toward the earphones. The charge node further includes an upstream port for coupling the audio data toward the earphones via the downstream port and coupling UE charge from the charge port toward the UE via the connector.

20 Claims, 3 Drawing Sheets

(51) Int. Cl.
*B23P 19/04* (2006.01)
*H04R 5/033* (2006.01)
(52) U.S. Cl.
CPC ...... *H04R 2460/01* (2013.01); *H04R 2460/15* (2013.01)
(58) Field of Classification Search
CPC ............ H04R 1/1091; H04R 2201/023; H04R 29/001; H04R 1/026; H04R 1/028; H04R 1/08; H04R 1/10; H04R 1/326; H04R 2420/09; H04R 2430/01; H04R 2460/01
USPC ............ 381/74, 150, 370, 71.1, 171.8, 71.9; 379/428.01, 428.02; 455/73, 572, 573; 700/94
See application file for complete search history.

(56) References Cited

U.S. PATENT DOCUMENTS

| | | | |
|---|---|---|---|
| 2015/0229161 A1* | 8/2015 | Talmola | H02J 7/0072 307/23 |
| 2016/0286019 A1* | 9/2016 | Broadley | H04M 1/72412 |
| 2017/0201832 A1* | 7/2017 | Reynolds, Jr. | H04R 1/1041 |

* cited by examiner

HEADSET CHARGER NODE

CROSS-REFERENCES TO RELATED APPLICATIONS

This patent application claims the benefit of provisional Application No. 62/414,615 filed Oct. 28, 2016 and entitled "Headset Charger Node", which is incorporated into this patent application by reference in its entirety.

BACKGROUND

Modern headphones, such as headphones that employ Active Noise Cancellation (ANC), require power in excess of power needed to operate a headphone speaker. For example, ANC headphone may draw power from a User Equipment (UE), such as an APPLE IPAD, IPOD, IPHONE, etc., via a corresponding UE port. The drawback with such a network is that the UE port is then employed for the headphones, which may leave no mechanism to charge the UE while the headphones are attached.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

Disclosed herein is a headset capable of simultaneously powering ANC capable earphones while charging an attached UE. The headset employs a single connector to couple to the UE. The headset also includes a control node to convert audio data from a digital format to an analog format and perform ANC related processes. A charge node is coupled between the connector and the control node. The charge node includes a charge port capable of receiving a connector from a charge source, such as a laptop, desktop, wall outlet, etc. The charge node forwards UE charge from the charge source to the UE via an upstream port. In some example, the charge node may also forward program data from the charge source to the UE via the upstream port. The charge node is coupled to the control node via a downstream port. The downstream port is coupled to the upstream port and configured to forward audio data as well as headset charge from the UE toward the control node. By employing this configuration, the headset can support simultaneous charging of the UE and powering the earphones. The headset can also support simultaneous data transfer between the charge source and the UE while playing audio data (e.g. music) over the earphones.

Figure 1:
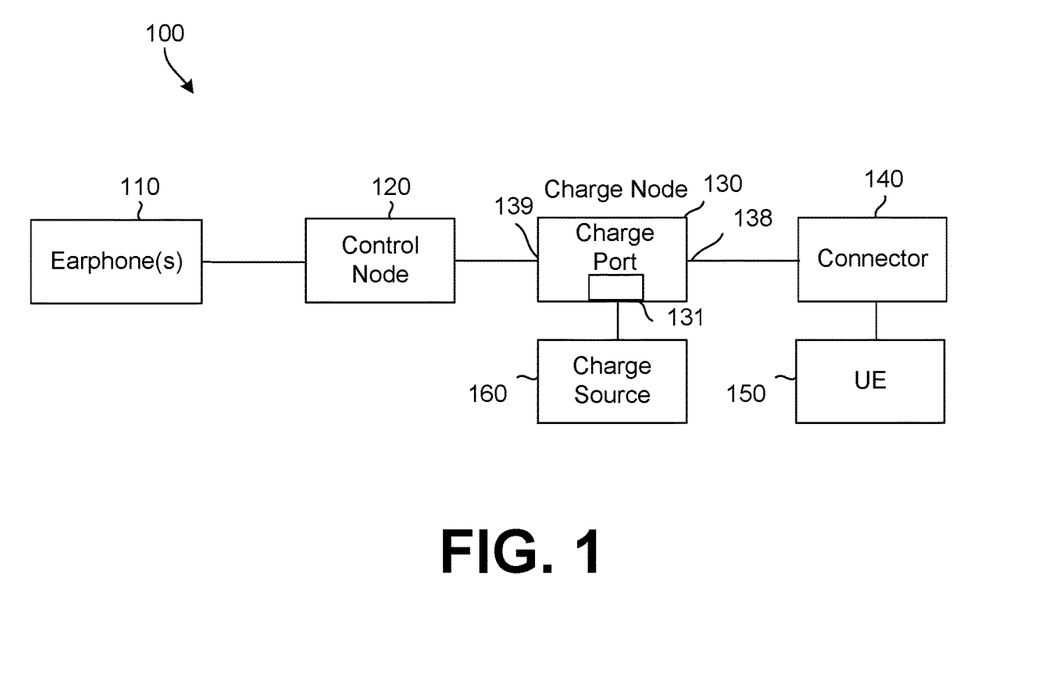
FIG. 1 is a schematic diagram of an example headset for charging a UE while powering the headset.

FIG. 1 is a schematic diagram of an example headset 100 for charging a UE while powering the headset. The headset 100 includes one or more earphones 110, a control node 120, a charge node 130, and a connector 140.

The earphones 110 may be any device capable of providing audio to a user when engaged. For example, the earphones 110 may include one or more earbuds that can be positioned inside a user's ear canal. As another example, the earphones 110 may include one or more pads that may be positioned against a user's ear. The earphones 110 may be connected by a structural support that attaches to a user's ears/face. In other examples, the earphones 110 may be connected via wired connections without direct structural support. The earphones 110 may also include a single earbud or a single stand-alone speaker device. Regardless of structural interconnections, the earphones 110 each employ a speaker to play analog audio data at a volume that can be perceived by a user. The earphones 110 may also provide some acoustic isolation between the user's ear canal and the ambient environment. The earphones 110 may also include microphones to provide ANC to a user. In ANC, ambient noise is recorded. An anti-noise soundwave is then created based on the ambient noise wave. The anti-noise wave is played by the speaker. The anti-noise wave combines destructively with the ambient noise wave, which cancels out the ambient noise. The anti-noise wave generation and/or audio processing is performed by components that require power in addition to power to operate the speakers.

The control node 120 is coupled to the charge node 130 and the earphones 110 via electrical cables. The control node 120 is any component capable of performing signal processing for the earphones 110. For example, the control node 120 may receive digital audio data from a UE 150. The control node 120 is configured to convert the audio data from a digital domain to an analog domain for use by the earphones 110. The control node 120 also receives any microphone signals containing ambient noise. The control node 120 then generates anti-noise signals based on the microphone signals to perform ANC. The control node 120 may also inject the anti-noise signals into the audio signal to be played by the earphones 110. The control node 120 may also performs other audio processing and control functions. For example, the control node 120 may include programmable button(s). The control node 120 may also employ other inputs that allow the user to control the functionality of the UE 150. Further, the control node 120 may include a voice microphone to support voice calls as well as uplink transmission based ANC.

When connected to the headset 100, a UE 150 provides audio data to the control node 120 for conversion to audio usable by the earphones 110. The UE may be any form of user device capable of generating audio data and providing operational power to the control node. For example, the UE 150 may be any battery powered portable APPLE device such as an IPAD, IPOD, IPHONE, or other music generation device. In some examples, the UE 150 may also be any other brand of battery powered cellular phone, tablet, and/or digital music generation device.

The connector 140 is any connection device capable of coupling the headset 100 to the UE 150 for providing data and/or power. As such, the connector 140 design may vary based on the UE 150. For example, for the current iteration of APPLE devices, the connector 140 is a Lightning connector. A Lightning connector includes a top side and a bottom side, with eight pins on either side. The pins on each side include a ground, a power, two pins for lane control, and four pins for differential communication lanes. The top side pins and the bottom side pins are substantially similar but positioned in reverse order so that the connector 140 can be coupled to the UE 150 when inverted without change in functionality. Depending on the example, the connector 140 could also be a universal serial bus (USB) version A (USB-A) connector, a USB version B (USB-B) connector, a USB version C (USB-C) connector, a USB version D (USB-D) connector, a USB micro connector, a USB mini connector, or combinations thereof. Regardless of the particular form employed, the connector 140 is configured to couple data and charge between the headset 100 and the user equipment (UE) 140.

The charge node 130 is coupled to the control node 120 and the connector 140. The charge node 130 includes a charge port 131 for receiving UE charge from a charge source 160. Depending on the example, the charge source 160 may be a wall outlet, a computer with a universal serial bus (USB) outlet, or other device capable of powering and/or communicating with the UE 150. As such, the charge port 131 is capable of communicating program data and UE charge from the charge source 160. As used herein, program data is any data transferred between the UE 150 and the charge source 160 that allows the charge source 160 to interact with the UE 150. For example, program data may include files, commands, etc. As used herein, UE charge is power sent from a charge source 160 to a UE 150 for purposes of charging the UE's 150 battery.

The charge node 130 also includes a downstream port 139 and an upstream port 138. The downstream port 139 may be permanently connected to the control node 120 via an electrical cable. Likewise, the upstream port 138 may be permanently connected to the connector 140 via an electrical cable. The downstream port 139 is configured to couple audio data from the UE 150 toward the earphones 110 via the control node 120. As used herein, audio data is any audio data intended for conversion into a sound wave by an earphone 110 speaker. The downstream port 139 may also couple headset charge from the UE 150 toward the control node 120. As used herein, headset charge is any power designated to operate the control node 120, earphones 110, and associated processes.

The upstream port 138 is designed to couple the audio data from the UE 150 toward the earphones 110 via the downstream port 139 and the control node 120. The upstream port 138 is also designed to couple program data between the charge source 160 and the UE 150 via the charge port 131. In other words, the charge node 130 is configured to simultaneously couple audio data from the UE 150 toward the control node 120 via the upstream port 138 and the downstream port 139 while coupling program data between the charge source 160 and the UE 150 via the charge port 131 and the upstream port 138. The upstream port 138 also couples UE charge from the charge port 131 toward the UE 150 via the connector 140. The upstream port 138 further couples headset charge from the UE 150 toward the control node 120 via the downstream port 129. In other words, the charge node is configured to simultaneously couple the UE charge from the charge source 160 toward the UE 150, while coupling headset charge from the UE 150 toward the control node 120.

By employing the abovementioned functionality, the headset 100 allows a user to use the earphones 110 while charging the UE 150 and/or transferring data between the charge source 160 and the UE 150. For example, by using this design, users can not only convert an existing analog headset into a Lightning headset, but also enable a collection of user experiences not possible with an analog headset. This configuration allows for a wide range of additional functionality as discussed below.

One of the features of a Lightning headset 100 is application based control. The application can be used to setup, tune, and customize the headset 100 for a specific user. The application can also be used to provide firmware upgrades for new features and/or bug fixes. The headset 100 also allows for single button application launch. In an example the control node 120 supports four buttons. One of the buttons can be programmed to launch an application. For example, a user can launch a music application with a single button press on the headset 100 without ever removing the UE 150 from their pocket. The headset 100 also allows for improved voice calls. For example, one of the features available some UEs 150 but missing in analog headsets is background noise reduction. Headset 100 allows for background noise reduction based on multi-microphone beam forming, for example by employing a plurality of microphones in the control node 120. The headset 100 also allows for enhanced audio quality. For example, the headset 100 may employ balanced output on the headphone's 100 control node 120 drivers, which allow support for a two volt root mean square (Vrms) output. As a specific example, this design supports audio processing that can be accomplished at twenty four bits at ninety six kilohertz (KHz) allowing for improved quality audio. The design further provides for brand specific tuning. For example, the control node 120 of the headset 100 may support bass enhancement, reverb, frequency tuning, etc., which are made possible by advanced audio processing. As such, the audio may be tuned to a specific voicing signature of the UE 150. In addition, a user can choose equalization settings for the headset using an application on the UE 150, for example by employing a five band graphic equalizer, etc. Further, the design supports application specific equalization. The design also allows different equalization settings to be loaded depending on which application is running at the UE 150. Accordingly, a user can have different equalizer settings depending on whether the user is employing voice call software or a music service application. The design also supports voice prompts. For example, voice prompts in multiple languages can be supported based on interaction between the UE 150 and the control node 120. The design also supports ANC and hybrid ANC employing both feedback (FB) and feedforward (FF) ANC by leveraging the earphones 110 and the control node 120. The design also supports ambient listening. I other words, in certain usage scenarios, the active noise cancellation can be offset by adding background noise. For example, a runner running on the street using ANC may wish to listen to traffic for safety reasons. This can be made possible by ambient listening.

Figure 2:
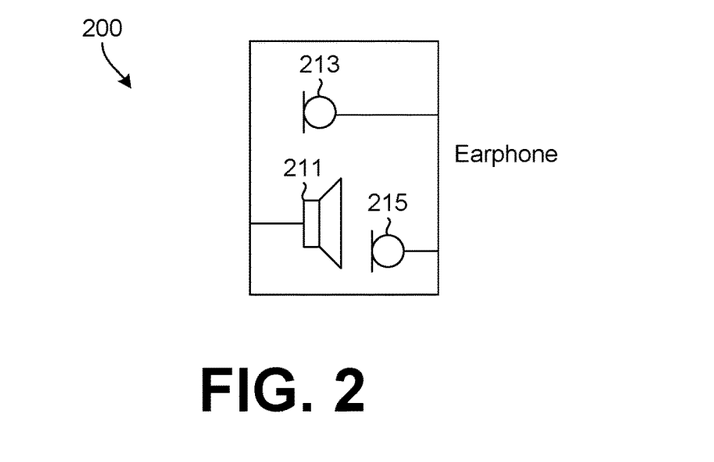
FIG. 2 is a schematic diagram of example earphone.

FIG. 2 is a schematic diagram of example earphone 200, which may implement an earphone 110 in a headset 100. Earphone 200 includes a FF microphone 213, an FB microphone 215, and a speaker 211. The FF microphone 213 is acoustically isolated from the speaker 211, for example by positioning the FF microphone 213 outside the ear canal in an earbud. The FB microphone 215 is positioned inside an acoustic barrier with the speaker 211, for example inside an ear canal in an earbud. Accordingly, the FF microphone 213 can record ambient noise outside the user's ear and the FB microphone 215 can record both audio data from the speaker 211 and any noise inside the users ear. The FF microphone 213 can be employed to cancel ambient noise. Meanwhile, the FB microphone 215 can be employed to react to changes inside the users ear. Hence, the FF microphone 213 and the FB microphone 215 can operate together to perform hybrid ANC. Further, the speaker 211 can play any audio data from a UE as converted from digital to analog. While a single earphone 200 is depicted, it should be noted that two earphones may be employed. Further, earphone 200 may be implemented as a headphone and/or as an earbud.

Figure 3:
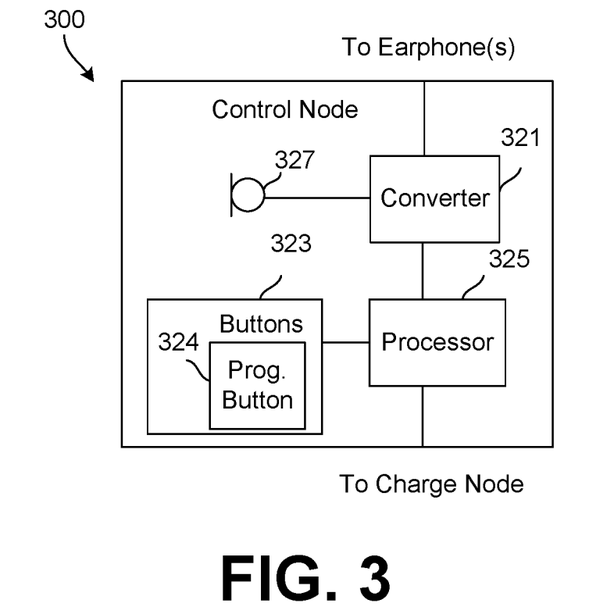
FIG. 3 is a schematic diagram of example control node.

FIG. 3 is a schematic diagram of example control node 300 which may implement a control node 120 in a headset 100. The control node 300 performs various computations to operate earphones in a headset. The control node 300 includes at least a processor 325 and a converter 321. The control node 300 may also include one or more voice microphones 327. The control node 300 may further include buttons 323 positioned on an outer surface of the control node 300 in a manner that are accessible to a user. The buttons 323 may include at least one programmable button 324.

The processor 325 is any component capable of performing signal processing. For example, the processor 325 may include a digital signal processor (DSP), an application specific integrated circuit (ASIC), a field programmable gate array (FPGA), or other processing technology. The processor 325 may also include and/or be connected to memory, such as registers, cache, random access memory (RAM), nonvolatile memory, volatile memory, or combinations thereof. By employing memory, the processor 325 can be programmed via firmware and/or software to perform corresponding functionality. For example, the processor 325 may perform frequency domain and/or time domain audio signal processing. The processor 325 may receive audio data from an UE via a connector and a charge node. The processor 325 may then perform equalization processes on the audio data to tune the audio data for the earphones. The processor 325 may also receive FB and/or FF microphone signals, generate corresponding anti-noise signals, and inject the anti-noise signals into the audio data for presentation to the user (e.g. ANC). Further, the processor 325 may communicate with the UE to perform voice call functionality by forwarding uplink voice data from the voice microphones 327 and forwarding downlink voice data to the earphones for presentation to the user. The processor 325 may also equalize and/or perform ANC on such voice data. The processor 325 may also transmit control data to the UE to operate UE applications upon receiving user input via buttons 323. The processor 325 may also be equipped to communicate with specified UE products with corresponding protocols. As such, the processor 325 may be capable of identifying the UE for further communications. The processor 325 may manage the performance of preceding functionality as well as all functionality discussed with respect to FIG. 1 above.

The converter 321 is coupled to the voice microphones 327, the earphones, and the processor 325. The converter 321 may include an analog to digital converter (ADC) and/or a digital to analog converter (DAC). While shown as a single component, it should be noted that an ADC and a DAC may be implemented separately for reasons of design convenience. The microphones and speakers at the earphones and the voice microphones 327 operate based on analog signals. Meanwhile, the processor may operate, in whole or in part, on digital signals. Hence the converter converts signals from a digital domain/format for use by the processor 325 to an analog domain/format for use by the voice microphone 327 and earphones, and vice versa.

The voice microphones 327 may be in included in some examples to support voice call functionality. For example, the voice call 327 microphones may capture a user's voice as voice data and forward the voice data to the processor 325 for processing. Voice data 327 may also be referred to as a sideband signal in some cases. The voice microphones 327 may also be controlled by the processor 325. For example, the voice microphones 327 may turned on and off by the processor 325. In some cases, the voice microphones 327 may include a plurality of microphones, for example two microelectron-mechanical systems (MEMS) microphones.

The voice microphones 327 may employ beamforming techniques to isolate a user's voice. For example, the processor 325 may apply weights to the voice data recorded by the voice microphones 327 to affect spatial/directional voice recording.

The buttons 323 may be positioned on an outer surface of the control node 300 in a manner that is accessible by a user. For example, the buttons 323 may include an increase volume button, a decrease volume button, a function button for performing a predefined function (e.g. pause, skip to next audio track, restart current audio track, return to previous audio track, etc.), and a programmable button 324. The functionality of the buttons 323 may be stored in memory at the processor 325. Hence, the processor 325, upon receiving input from a button, may obtain a corresponding control signal from memory and forward the control signal to the UE to control an application. The processor 325 may allow a user to set the functionality of the programmable button 324. For example, an application operating at the UE may allow a user to select a functionality for the button from a plurality of preset functionalities. The processor 325 may receive the functionality setting from the UE and store a corresponding setting in memory. Accordingly, the processor 325 may transmit the programmed control signal, as stored in memory, to the UE to control the functionality of the UE upon activation by the user. In other words, the control node 300 may include a programmable button configured transmit user selected control data toward the UE to control the UE upon activation.

In summary, the control node 300 may acts as an audio processor used to convert digital audio signals from a connector (e.g. a Lightning electrical connector) to analog signals for presentation as sound by earphones or earbuds. The control node may include a digital audio input interface for use in conjunction with an APPLE lighting compatible product. The control node 300 may also support stereo headphone outputs. The control node 300 may also include four button 323 inputs acting as a UE headphone remote control interface.

Figure 4:
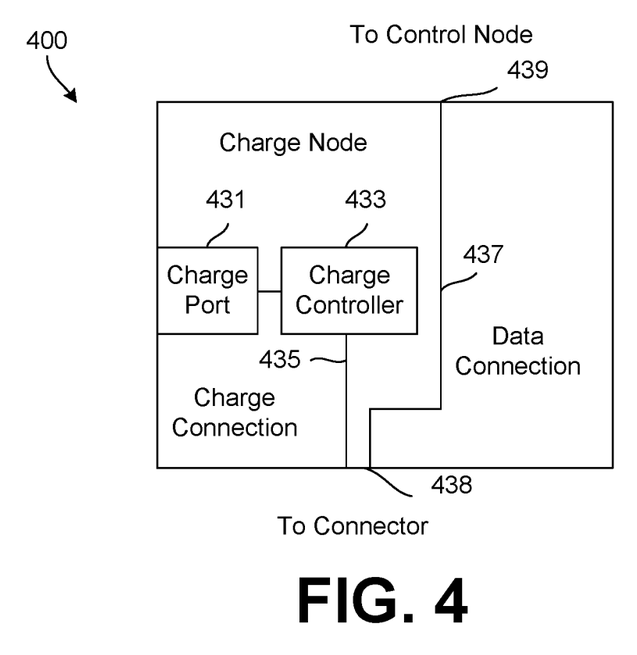
FIG. 4 is a schematic diagram of example charge node.

FIG. 4 is a schematic diagram of example charge node 400 which may implement a charge node 130 in a headset 100. The charge node 430 includes a charge port 431, an upstream port 438, and a downstream port 439, which may be substantially similar to charge port 131, upstream port 138, and downstream port 139, respectively. As shown, the charge port 431 is coupled to the upstream port 438 via an electrical charge connection path 435, which may traverse a charge controller 433. The upstream port 438 is also coupled to the downstream port 439 via an electrical data connection path 437.

The charge controller 433 is any component capable of managing charge amplitude between a charge source and a UE. The charge controller 433 is coupled between the charge port 431 and the upstream port 438. The charge controller 433 may also be coupled between the upstream port 438 and the downstream port 439 in some examples. The charge controller 433 acts as a gate to enable charging upon command from the UE. Hence, the charge controller 433 may limit and control the charging process in some examples.

In some examples, the data connection path 437 acts as a pass through charge and data line. For example, the data connection path 437 may couple audio data from the upstream port 438 to the downstream port 439. The downstream port 439 may then couple the audio data toward the earphones. The data connection path 437 may also couple headset charge, originating from the UE, from the upstream port 438 to the downstream port. The headset charge may then be employed to power the earphones and components in the control node.

The charge connection path 435 couples the charge port 431 to the upstream port 438. Hence, the charge connection path 435 couples UE charge from a charge source toward the UE via the upstream port 438. The charge connection path 435 may also couple program data from the charge source toward the UE. Specifically, the charge connection path 435 may couple the program data from the charge port 431 across the charge node 400 and to the upstream port 438. Accordingly, by employing the charge connection path 435 and the data connection path 437, the charge node 400 can simultaneously couple headset charge from the UE to the headphones and UE charge from the charge source to the UE. This allows the headphones to play audio data while the UE is charging. Further, by employing the charge connection path 435 and the data connection path 437, the charge node 400 can simultaneously communicate audio data from the UE to the headphones, via the upstream port 438 and the downstream port 439, while communicating program data from the charge source to the UE, via the charge port 431 and the upstream port 438. As noted above, the control node 400 is configured to couple the UE via a connector, such as a Lightning connector, a USB connector, etc. As such, the charge node 400 is wired to allow UE charge, headset charge, audio data, and program data to all traverse the connector to the UE simultaneously and/or substantially simultaneously.

In summary, the charge node 400 may act an accessory for Lightning based audio headsets. The charge node 400 allows a user to plug a headset into a Lightning receptacle on an APPLE device to power and enable operation of the headset. This overcomes an issue where the APPLE device would otherwise be prevented from charging because the receptacle is coupled to the headset, which does not provide charging capability for the APPLE device.

To solve this problem, the charge node allows a user to have a Lightning based headset connected to the APPLE device and at the same time enable the charging of the APPLE device by coupling a charger/charge source to the charge node 400. In other words, both the headset and the charger are coupled to the charge node 400, and then the charge node 400 is coupled to the APPLE device. The charge node 400 enables the charger to electrically charge the APPLE device, while also passing the audio signals from the APPLE device to the headset. The headset may be a Lightning headset, and/or an analog headset coupled through the audio control node 300 described above. In some examples, the charge node 400 is positioned in-line between the cable from the Lightning headset and the APPLE device. The charge node 400 further includes a female Lightning receptacle (e.g. in the charge port 431) that receives a connection from a Lightning battery charger. The charge node 400 routes the power signals to the APPLE device for charging, while also passing the audio signals straight through from the APPLE device to the Lightning headset.

Figure 5:
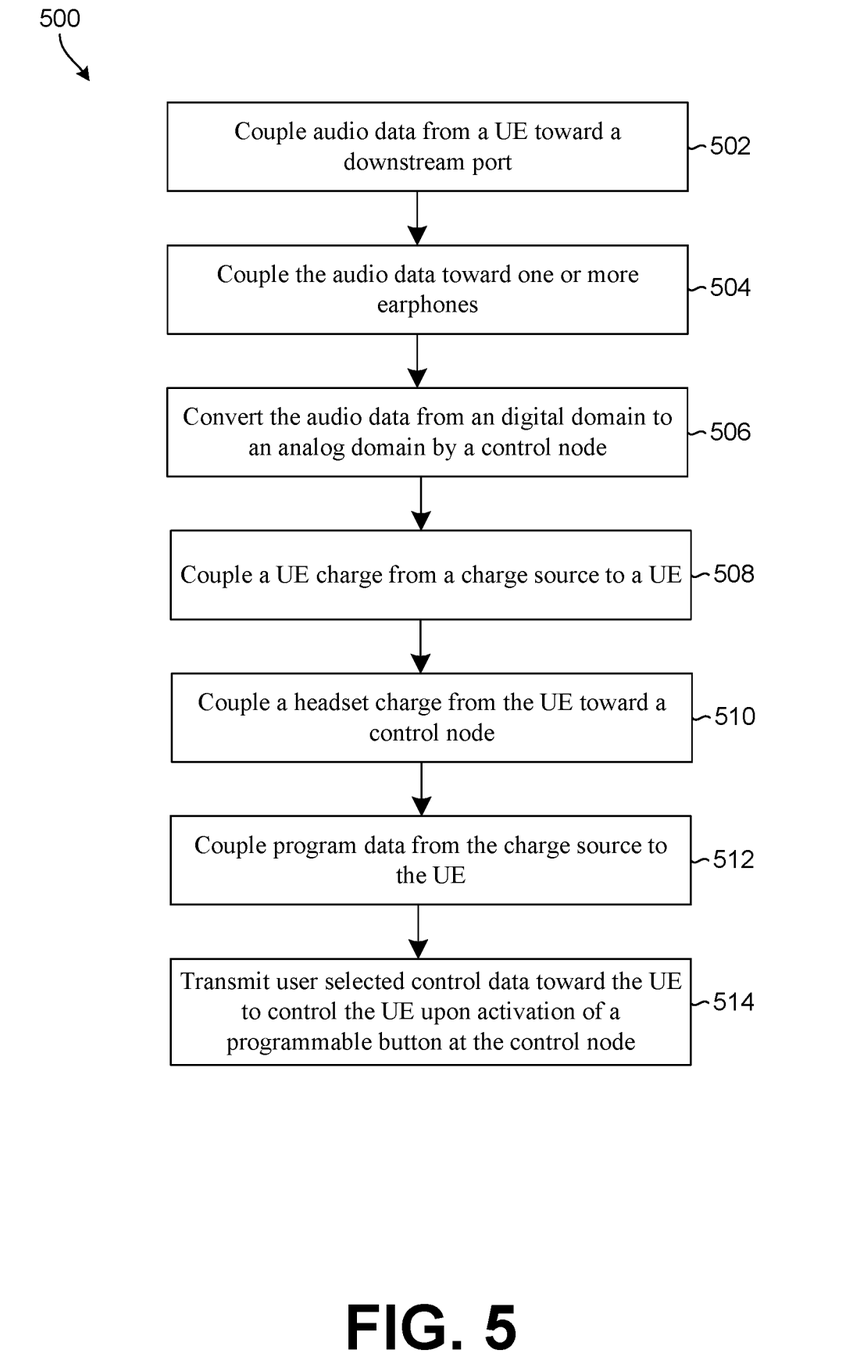
FIG. 5 is a flowchart of an example method of operating a headset with a charge node.

FIG. 5 is a flowchart of an example method 500 of operating a headset with a charge node, for example by employing a headset 100, an earphone 200, a control node 300, a charge node 400, or combinations thereof. As noted above, method 500 allows for simultaneous charging and communication between a charge source and a UE while employing the UE to play audio data via earphones and power a headset to provide ANC and related functions.

At block 502, audio data is coupled from a UE via an upstream port. The audio data is then forwarded through a charge node to a downstream port. At block 504, the audio data is coupled from the downstream port toward one or more earphones. The audio data is received from the UE in a digital format. Hence, at block 506, the audio data is forwarded to the earphones via a control node. The control node converts the audio data from a digital domain to an analog domain. The control node may also employ the audio data in conjunction with ANC processes.

At block 508, a UE charge is coupled from a charge source, such as a computer, to a UE (e.g. a cell phone). The UE charge is received at a charge port of a charge node and forwarded through the upstream port of the charge node to the UE. The UE charge may be employed to charge a battery of the UE. Further, at block 510, a headset charge is coupled from the UE toward the control node. Specifically, the headset charge is received at the upstream port of the charge node and forwarded via the downstream port. It should be noted that the UE may be charged while powering the headset. Hence, the headset charge may be forwarded to the control node while the UE charge is coupled from the charge source to the UE. In other words, blocks 508 and 510 may occur simultaneously.

At block 510, program data may be coupled from the charge source to the UE. For example, when the charge source configured to transfer files to and from the UE. The program data is received at the charge port of the charge node and coupled to the upstream port for communication to the UE. It should be noted that the program data may be transferred to the UE while the UE is coupling audio data towards the control node/earphones. Hence, blocks 502, 504, and 512 may occur simultaneously.

At block 514, a user may interact with a programmable button on the control node. The control node may the transmit user selected control data toward the UE. The control data may be used to control the UE, for example upon activation of a programmable button at the control node. The control data may include a predetermined signal obtained from memory by a processor. The control data may then be forwarded toward the UE via the downstream port and the upstream port of the charge node. The control data may then be forwarded to the UE via a connector. As noted above, the connector may be a Lightning connector, USB-A connector, a USB-B connector, a USB-C connector, a USB-D connector, a USB micro connector, a USB mini connector, or combinations thereof. Further, all the blocks of method 500 may occur simultaneously and/or substantially simultaneously. Hence, the audio data of blocks 502 and 503, the UE charge of block 508, the headset charge of block 510, the program data of block 512, and/or the control data of block 514 may substantially simultaneously traverse the Lightning connector by employing the method 500 and associated charge node and control node.

Examples of the disclosure may operate on a particularly created hardware, on firmware, digital signal processors, or on a specially programmed general purpose computer including a processor operating according to programmed instructions. The terms "controller" or "processor" as used herein are intended to include microprocessors, microcomputers, Application Specific Integrated Circuits (ASICs), and dedicated hardware controllers. One or more aspects of the disclosure may be embodied in computer-usable data and computer-executable instructions (e.g. computer program products), such as in one or more program modules, executed by one or more processors (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as Random Access Memory (RAM), Read Only Memory (ROM), cache, Electrically Erasable Programmable Read-Only Memory (EEPROM), flash memory or other memory technology, and any other volatile or nonvolatile, removable or non-removable media implemented in any technology. Computer readable media excludes signals per se and transitory forms of signal transmission. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

Examples

Illustrative examples of the technologies disclosed herein are provided below. An embodiment of the technologies may include any one or more, and any combination of, the examples described below.

Example 1 includes a headset comprising: one or more earphones; a connector configured to couple data and charge between the headset and a user equipment (UE); and a charge node including: a charge port for receiving UE charge from a charge source, a downstream port for coupling audio data toward the earphones, and an upstream port for coupling the audio data toward the earphones via the downstream port and coupling UE charge from the charge port toward the UE via the connector.

Example 2 includes the headset of Example 1, further comprising a control node coupled to the charge node and the earphones, the control node to convert audio data from a digital domain to an analog domain for use by the earphones.

Example 3 includes the headset of any of Examples 1-2, wherein the upstream port further couples headset charge from the UE toward the control node via the downstream port.

Example 4 includes the headset of any Examples 1-3, wherein the charge node is configured to simultaneously couple the UE charge toward the UE and headset charge and from the UE toward the control node.

Example 5 includes the headset of any of Examples 1-4, wherein the charge node is configured to simultaneously couple audio data from the UE toward the control node via the upstream port and the downstream port and program data between the charge source and the UE via the charge port and the upstream port.

Example 6 includes the headset of any of Examples 1-5, wherein the control node includes a programmable button configured transmit user selected control data toward the UE to control the UE upon activation.

Example 7 includes the headset of any of Examples 1-6, further comprising a charge controller coupled to the charge port and the upstream port, the charge controller configured to manage charge amplitude between the charge source and the UE.

Example 8 includes the headset of any of Examples 1-7, wherein the connector is a Lightning connector, a universal serial bus (USB) version A (USB-A) connector, a USB version B (USB-B) connector, a USB version C (USB-C) connector, a USB version D (USB-D) connector, a USB micro connector, a USB mini connector, or combinations thereof.

Example 9 includes a charge node comprising: a downstream port to couple audio data toward one or more earphones; an upstream coupled to the downstream port, the upstream port to couple the audio data to the downstream port; a charge port coupled to the upstream port, the charge port to couple user equipment (UE) charge toward a UE via the upstream port.

Example 10 includes the charge node of Example 9, wherein the upstream port is further to couple headset charge from the UE toward a control node via the downstream port.

Example 11 includes the charge node of any of Examples 9-10, wherein the upstream port simultaneously couples the headset charge from the UE and the UE charge toward the UE.

Example 12 includes the charge node of any Examples 9-11, wherein the charge port is further to couple program data toward the UE via the upstream port.

Example 13 includes the charge node of any of Examples 9-12, wherein the upstream port simultaneously communicates audio data to the downstream port and communicates program data with the charge port.

Example 14 includes the charge node of any of Examples 9-13, wherein the upstream port is configured to couple to the UE via a Lightning connector, a universal serial bus (USB) version A (USB-A) connector, a USB version B (USB-B) connector, a USB version C (USB-C) connector, a USB version D (USB-D) connector, a USB micro connector, a USB mini connector, or combinations thereof.

Example 15 includes a method comprising: coupling, via an upstream port, audio data toward a downstream port; coupling, via the downstream port, audio data toward one or more earphones; and coupling, via a charge port and the upstream port, user equipment (UE) charge from a charge source to a UE.

Example 16 includes the method of Example 15, further comprising coupling headset charge from the UE toward a control node via the upstream port and the downstream port while coupling the UE charge from the charge source to the UE.

Example 17 includes the method of any of Examples 15-16, further comprising coupling program data from the charge source to the UE via the charge port and the upstream port while coupling the audio data toward the earphones.

Example 18 includes the method of any of Examples 15-17, further comprising converting the audio data from a digital domain to an analog domain by a control node.

Example 19 includes the method of any of Examples 15-18, further comprising transmitting user selected control data toward the UE to control the UE upon activation of a programmable button at the control node.

Example 20 includes the method of any of Examples 15-19, wherein the UE charge and the audio data are coupled from the UE via a Lightning connector, a universal serial bus (USB) version A (USB-A) connector, a USB version B (USB-B) connector, a USB version C (USB-C) connector, a USB version D (USB-D) connector, a USB micro connector, a USB mini connector, or combinations thereof.

Example 21 includes a computer program product stored in a non-transitory memory that, when executed by a processor, causes a headset to perform any of the functionality of Examples 1-20.

The previously described examples of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

What is claimed is:

1. A headset comprising:
   one or more earphones;
   a connector configured to couple data and charge between the headset and a user equipment; and
   a charge node including
     a charge port for receiving the user equipment charge from a charge source,
     a downstream port for coupling audio data toward the earphones, and
     an upstream port for coupling the audio data toward the earphones via the downstream port and coupling the user equipment charge from the charge port toward the user equipment via the connector.

2. The headset of claim 1, further comprising a control node coupled to the charge node and the earphones, the control node to convert the audio data from a digital domain to an analog domain for use by the earphones.

3. The headset of claim 2, wherein the upstream port further couples headset charge from the user equipment toward the control node via the downstream port.

4. The headset of claim 3, wherein the charge node is configured to simultaneously couple the user equipment charge toward the user equipment and the headset charge and from the user equipment toward the control node.

5. The headset of claim 2, wherein the charge node is configured to simultaneously couple the audio data from the user equipment toward the control node via the upstream port and the downstream port and program data between the charge source and the user equipment via the charge port and the upstream port.

6. The headset of claim 2, wherein the control node includes a programmable button configured transmit user selected control data toward the user equipment to control the user equipment upon activation.

7. The headset of claim 1, further comprising a charge controller coupled to the charge port and the upstream port, the charge controller configured to manage charge amplitude between the charge source and the user equipment.

8. The headset of claim 1, wherein the connector is a Lightning connector, a universal serial bus version A connector, a universal serial bus version B connector, a universal serial bus version C connector, a universal serial bus version D connector, a universal serial bus micro connector, a universal serial bus mini connector, or combinations thereof.

9. A charge node comprising:
   a downstream port to couple audio data toward one or more earphones;
   an upstream port coupled to the downstream port, the upstream port to couple the audio data to the downstream port;
   a charge port coupled to the upstream port, the charge port to couple user equipment charge toward a user equipment via the upstream port.

10. The charge node of claim 9, wherein the upstream port is further to couple headset charge from the user equipment toward a control node via the downstream port.

11. The charge node of claim 10, wherein the upstream port simultaneously couples the headset charge from the user equipment and the user equipment charge toward the user equipment.

12. The charge node of claim 9, wherein the charge port is further to couple program data toward the user equipment via the upstream port.

13. The charge node of claim 12, wherein the upstream port simultaneously communicates the audio data to the downstream port and communicates program data with the charge port.

14. The charge node of claim 9, wherein the upstream port is configured to couple to the user equipment via a Lightning connector, a universal serial bus version A connector, a universal serial bus version B connector, a universal serial bus version C connector, a USB universal serial bus version D connector, a universal serial bus micro connector, a universal serial bus mini connector, or combinations thereof.

15. A method comprising:
   coupling, via an upstream port, audio data toward a downstream port;
   coupling, via the downstream port, audio data toward one or more earphones; and
   coupling, via a charge port and the upstream port, user equipment charge from a charge source to a user equipment.

16. The method of claim 15, further comprising coupling headset charge from the user equipment toward a control node via the upstream port and the downstream port while coupling the user equipment charge from the charge source to the user equipment.

17. The method of claim 15, further comprising coupling program data from the charge source to the user equipment via the charge port and the upstream port while coupling the audio data toward the earphones.

18. The method of claim 15, further comprising converting the audio data from a digital domain to an analog domain by a control node.

19. The method of claim 18, further comprising transmitting user selected control data toward the user equipment to control the user equipment upon activation of a programmable button at the control node.

20. The method of claim 15, wherein the user equipment charge and the audio data are coupled from the user equipment via a Lightning connector, a universal serial bus version A connector, a universal serial bus version B connector, a universal serial bus version C connector, a universal serial bus version D connector, a universal serial bus micro connector, a universal serial bus mini connector, or combinations thereof.

* * * * *

UNITED STATES PATENT AND TRADEMARK OFFICE
CERTIFICATE OF CORRECTION

PATENT NO. : 11,102,580 B2  
APPLICATION NO. : 15/795721  
DATED : August 24, 2021  
INVENTOR(S) : Manpreet S. Khaira et al.

Page 1 of 1

It is certified that error appears in the above-identified patent and that said Letters Patent is hereby corrected as shown below:

In the Claims

Column 12, Line 52, Claim number 14, delete "USB".

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*